United States Patent [19]

Johns

[11] 3,965,785

[45] June 29, 1976

[54] APPARATUS FOR CUTTING SHEET MATERIAL

[75] Inventor: Herman S. Johns, Gastonia, N.C.

[73] Assignee: Medical Specialties, Inc., Charlotte, N.C.

[22] Filed: Feb. 26, 1975

[21] Appl. No.: 553,444

[52] U.S. Cl. .................................... 83/316; 83/311; 83/314; 83/317

[51] Int. Cl.² ...................... B26D 1/56; B23D 25/06

[58] Field of Search ............. 83/316, 317, 314, 311, 83/315

[56] References Cited

UNITED STATES PATENTS

| | | | |
|---|---|---|---|
| 935,340 | 9/1909 | Middlesworth | 83/316 |
| 1,417,609 | 5/1922 | Koerner | 83/316 |
| 1,750,531 | 3/1930 | Lichtenstein | 83/316 |

*Primary Examiner*—Donald R. Schran
*Attorney, Agent, or Firm*—Bell, Seltzer, Park & Gibson

[57] ABSTRACT

An apparatus for accurately and efficiently cutting a web of sheet material into individual cut segments, and which comprises a pivotal rocker arm, and means for periodically oscillating the rocker arm which includes an endless chain having one or more cams carried thereby. Each cam is positioned to operatively engage the rocker arm during its traverse of a portion of the trackway followed by the chain to thereby oscillate the rocker arm. The rocker arm is operatively connected to a pair of cutting knives so the knives oscillate therewith, and toggle means is provided for actuating the cutting knives during each forward oscillation thereof.

26 Claims, 12 Drawing Figures

FIG-8
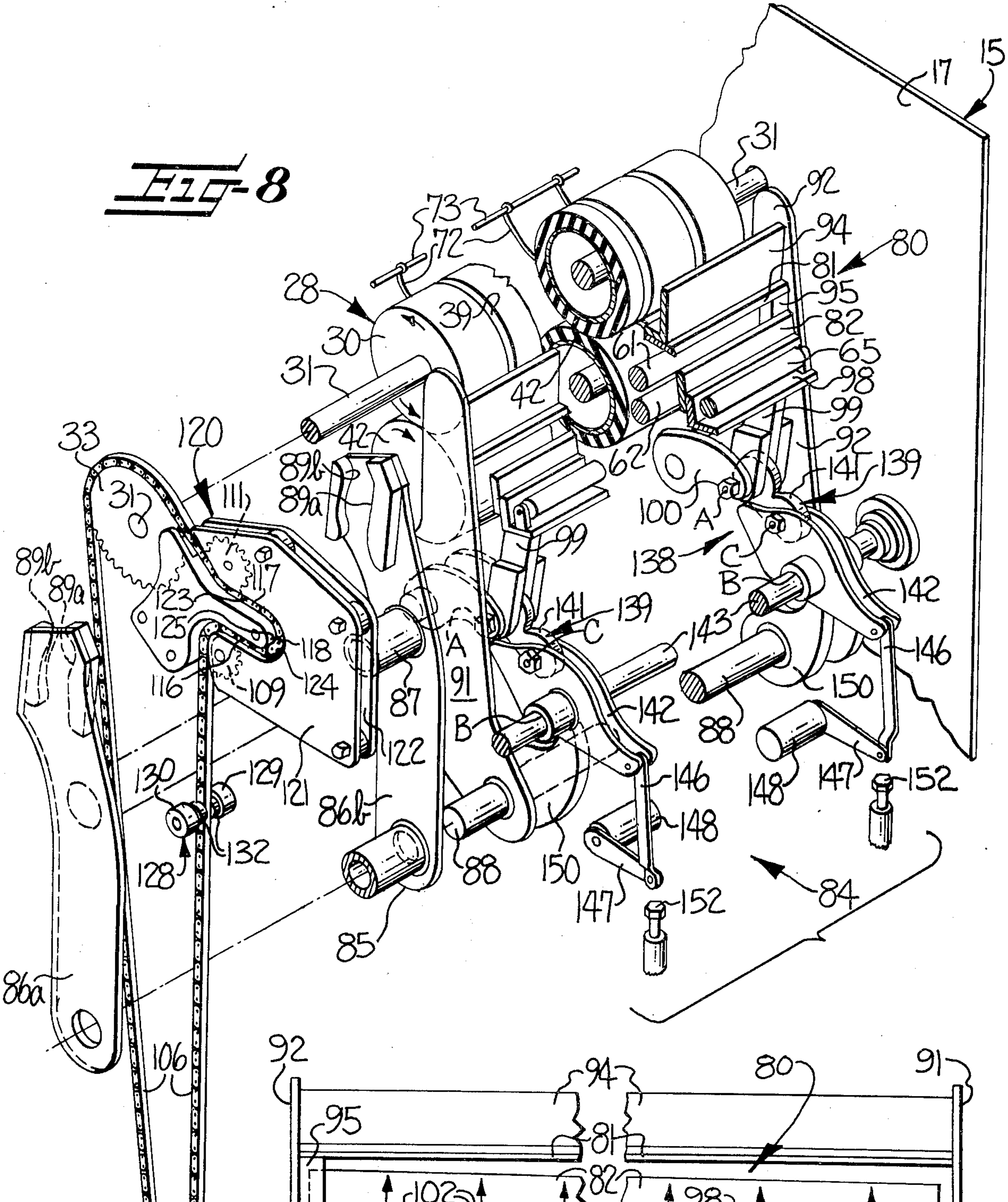
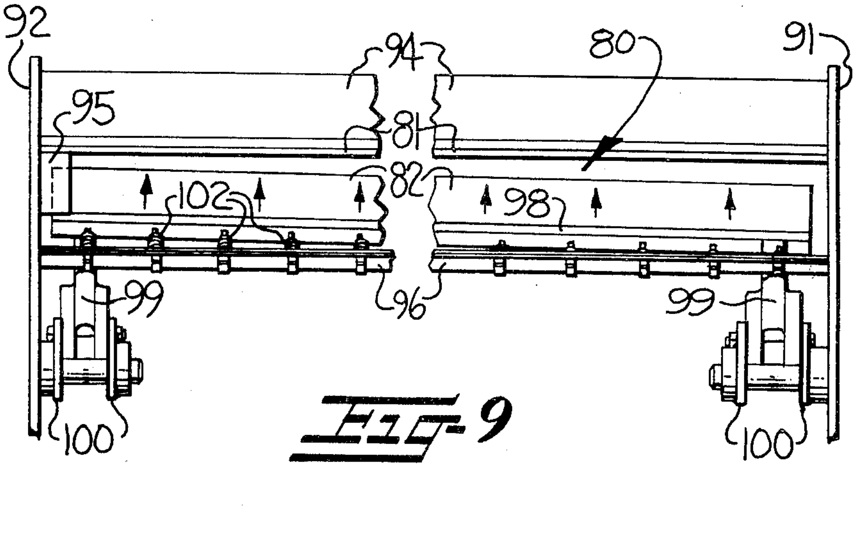
FIG-9

APPARATUS FOR CUTTING SHEET MATERIAL

The present invention relates to an apparatus for accurately and efficiently cutting a web of sheet material, such as paper, plastic film, or fabric into individual cut segments.

Machines are presently known and marketed for cutting an elongated web of paper or similar sheet material into cut lengths of a predetermined dimension. Typically, these prior machines include feeding rolls for advancing the web and which are intermittently operated by a brake-clutch arrangement such that the advance of the web is stopped during the cutting operation. While such machines have met with some commercial success, the brake-clutch arrangement is undesirable in that it not only limits the speed of operation of the machine, but is also puts considerable stress on the various components during the starting and stopping operations and thereby contributes to excessive wear and the early failure thereof. Further, the starting and stopping operations often result in slippage of the web between the feeding rolls, thereby resulting in inaccuracies in the desired cut length, and the lack of a square cut edge.

It has also been proposed to employ a cutting machine which includes a "flying shear" arrangement. In such machines, the web is advanced at a continuous speed, and the cutting knives are mounted on a pivoted arm which is oscillated by a cam arrangement such that the knife moves forwardly at the speed of the web when the cutting action is initiated. While the "flying shear" overcomes some of the problems associated with the brake-clutch arrangement, it suffers from a significant disadvantage in that adjustment of the length of cut can only be effected by a relatively complex procedure, such as changing the gear ratio between the feed rolls and the cam drive. Also, adjustment of the cut length cannot readily be effected between wide limits. Still further, known prior designs of this type incorporate a relatively complex structural arrangement for actuating the cutting blades during the advance of pivot arm.

It is accordingly an object of the present invention to provide an apparatus for accurately and efficiently cutting a continuous web of sheet material into individual cut segments of predetermined length, and which avoids the above noted problems aand disadvantages associated with the operation of known machines.

It is another object of the present invention to provide an apparatus of the desired type which has provision for readily adjusting the length of the cut segments between wide limits, and which avoids any use of a brake-clutch arrangement for intermittently starting and stopping the advance of the web material.

It is a further object of the present invention to provide an apparatus of the described type wherein the web material is continuously advanced therethrough, and the cutting knives are oscillated in the direction of the advancing web material by an arrangement which permits ready adjustment of the length of the cut segments.

It is still another object of the present invention to provide an apparatus of the described type which is able to achieve a square cut, and a high degree of repetitive accuracy in the length of the cut segments.

It is a more specific object of the present invention to provide an apparatus of the described type which incorporates a toggle linkage for quickly actuating the cutting blades to assure the non-interference of the blades with the advancing web of material.

These and other objects and advantages of the present invention are achieved in the embodiment illustrated herein by the provision of an apparatus which comprises feeding rolls for advancing the web along a predetermined path of travel, knife means extending transversely across the path of travel for cutting the web into individual cut segments, means for mounting the knife means so that it may be reciprocated forwardly and rearwardly in a direction substantially parallel to the advance of the web, an endless chain having one or more cams carried thereon for reciprocating the knife means, and a toggle linkage for actuating the knife means during each forward reciprocation thereof.

Some of the objects and advantages of the invention having been stated, others will appear as the description proceeds when taken in connection with the accompanying drawings, in which FIG. 1 is a rear elevation view of an apparatus embodying the features of the present invention;

FIG. 8 is a fragmentary perspective view of the apparatus;

FIG. 9 is a fragmentary front elevation view of the cutting blades of the apparatus;

Figure 1:
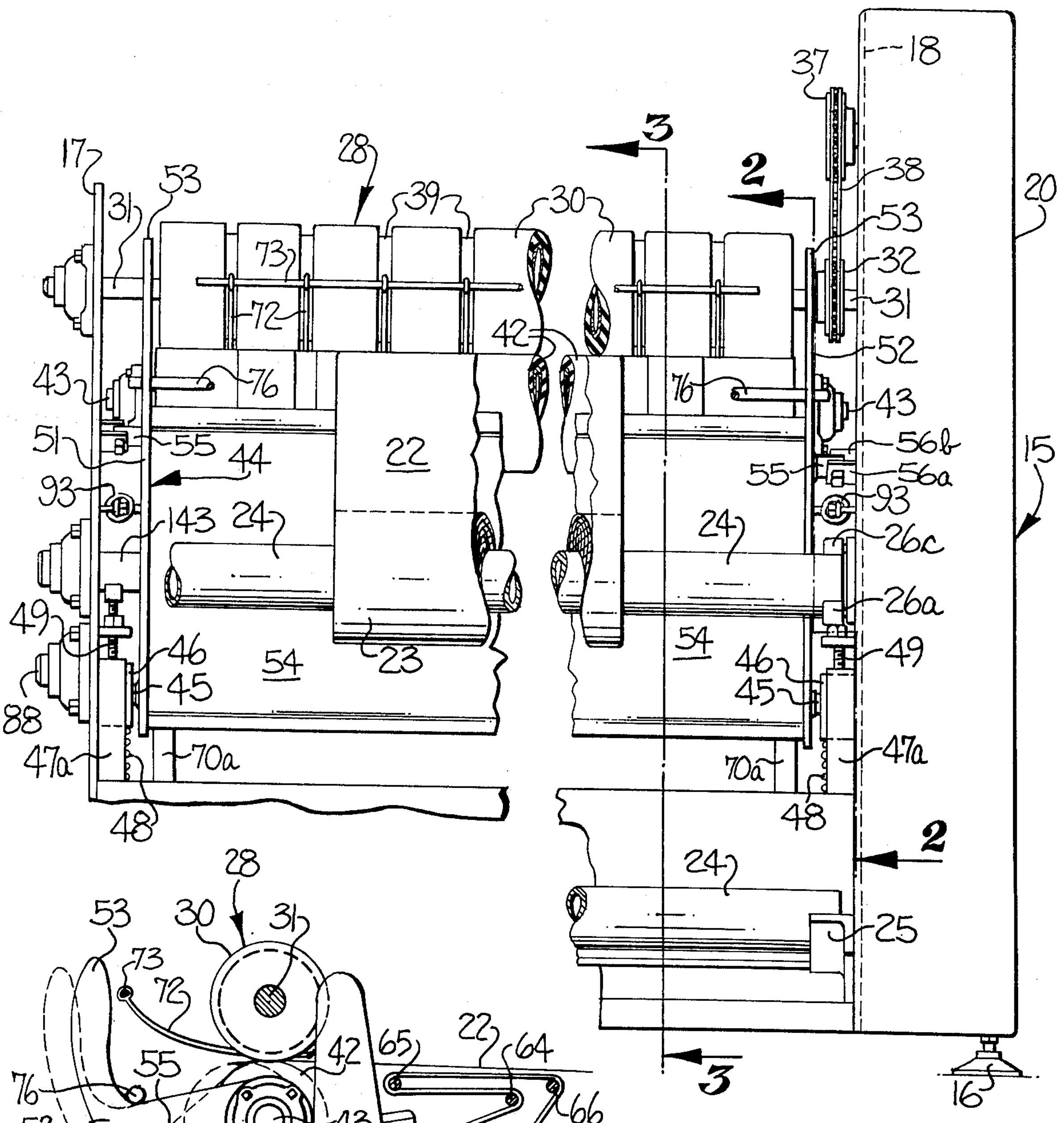

Referring more specifically to the drawings, the illustrated apparatus comprises a frame 15 supported by four adjustable floor supports 16, and including a pair of vertically disposed side support plates 17, 18, a horizontally disposed lower support plate 19, and a box-like housing 20 overlying the outer face of the side support plate 18.

The apparatus of the present invention is adapted to accurately and efficiently cut an elongated web 22 of sheet material, such as paper, thin plastic film, or fabric into individual cut segment, the web being provided in the form of a supply roll 23 wound on a tubular shaft 24. Alternatively, the roll 23 may be wound on a separate paper support tube (not shown) which is slipped onto the shaft 24. A number of the shafts 24 may be conveniently stored on the tray 25 provided in the lower portion of the frame, note FIG. 3.

The wound supply roll 23 of web material is operatively positioned on the apparatus by three bearings **26*a*, 26*b*, 26*c* carried by each of the side support plates 17, 18, such that the supply roll may be easily positioned thereon simply by lowering the roll so that the shaft 24** rests upon the bearings.

Means 28 are provided for continuously feeding the web 22 from the supply roll 23 and along a predetermined path of travel as hereinafter further defined. The feeding means 28 includes a upper feed roller 30 which is mounted for rotation with the horizontal shaft 31. The shaft 31 is rotatably carried between the side support plates 17, 18 so as to extend transverse to the path of travel of the advancing web, and it has one end thereof which extends through the plate 18 and into the housing 20. A first sprocket 32 is fixedly carried by the shaft 31 immediately adjacent and inside the support plate 18 (note FIG. 1), and a second or drive sprocket 33 is fixedly carried by the shaft 31 within the housing (note FIGS. 8 and 10). The electric motor 35 acts through the gear reduction box 36, sprocket 37, and drive chain 38 to rotate the sprocket 32, and thereby also rotate the shaft 31, upper roller 30, and drive sprocket 33. Also, the upper feed roller includes a plurality of circumferential channels 39 spaced along the longitudinal length thereof for the purposes hereinafter set forth.

The feeding means 28 further comprises a second or lower feed roller 42 mounted for rotation with a shaft 43 positioned below and parallel to the shaft 31 of the upper roller such that the upper and lower rollers define a nip therebetween. More particularly, the shaft 43 of the lower roller is rotatably mounted on a carriage 44 which in turn is pivotally mounted on the frame for pivotal movement about the horizontal axis defined by the shaft 45. Both the upper and lower feed rollers typically comprise a high durometer rubber covered steel roll.

Figure 3:
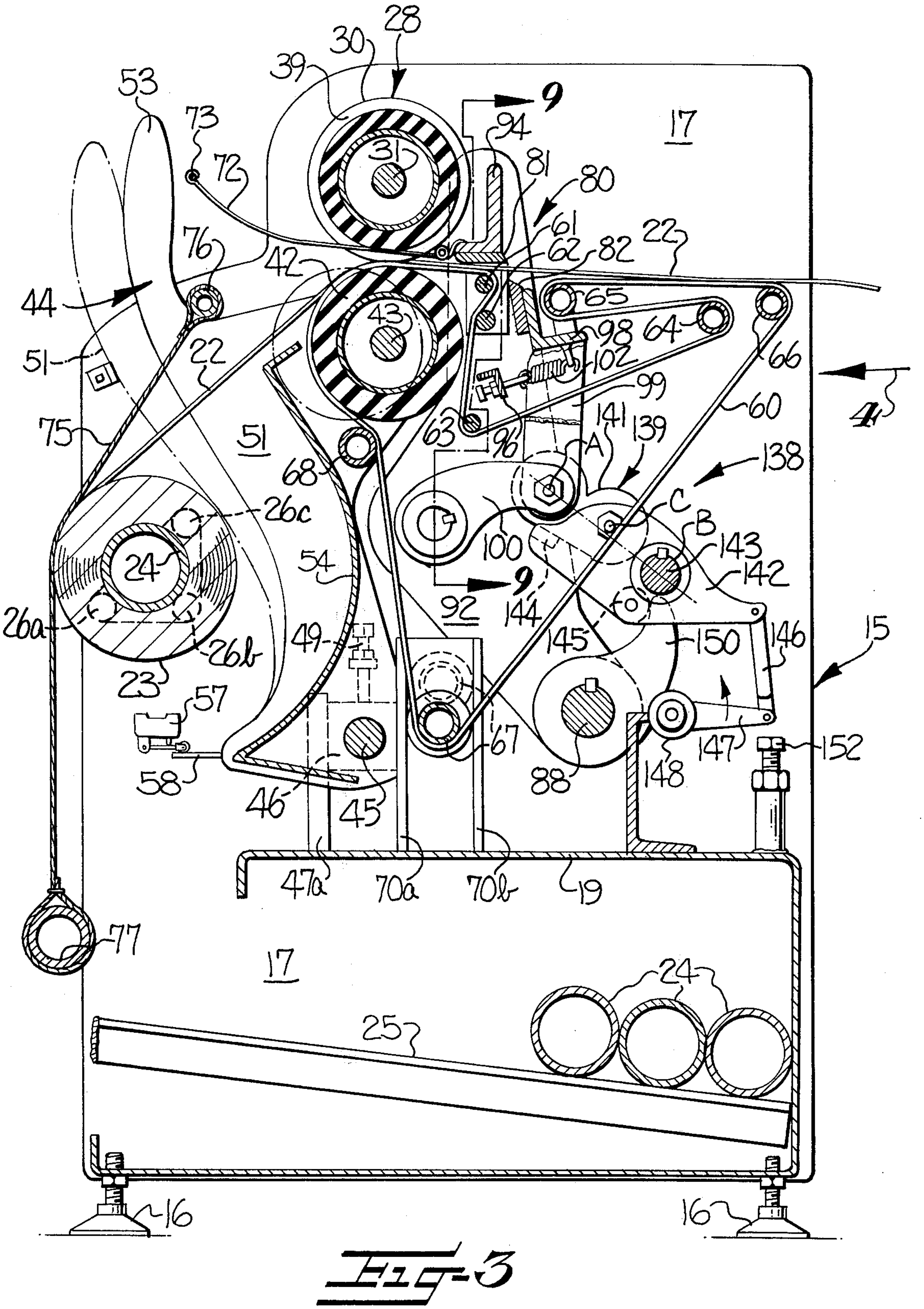
FIG. 3 is a view similar to FIG. 2, but in a slightly enlarged scale and taken substantially along the line 3—3 of FIG. 1.

The shaft 45 of the carriage 44 is positioned parallel to and generally below the shafts of the upper and lower feed rollers as best seen in FIG. 3, and each end of the shaft 45 is rotatably carried by a bushing 46 which is slidably mounted for limited vertical movement between side brackets *47a, 47b* affixed to the side support plates 17, 18 of the frame. A spring 48 is positioned below each bushing 46 and rests upon the horizontal support plate 19 to bias the bushing and thus the carriage and lower feed roller upwardly. An adjustable abutment in the form of a threaded member 49 is carried by each side support plate 17, 18 for limiting the upward movement of the carriage.

Figure 2:
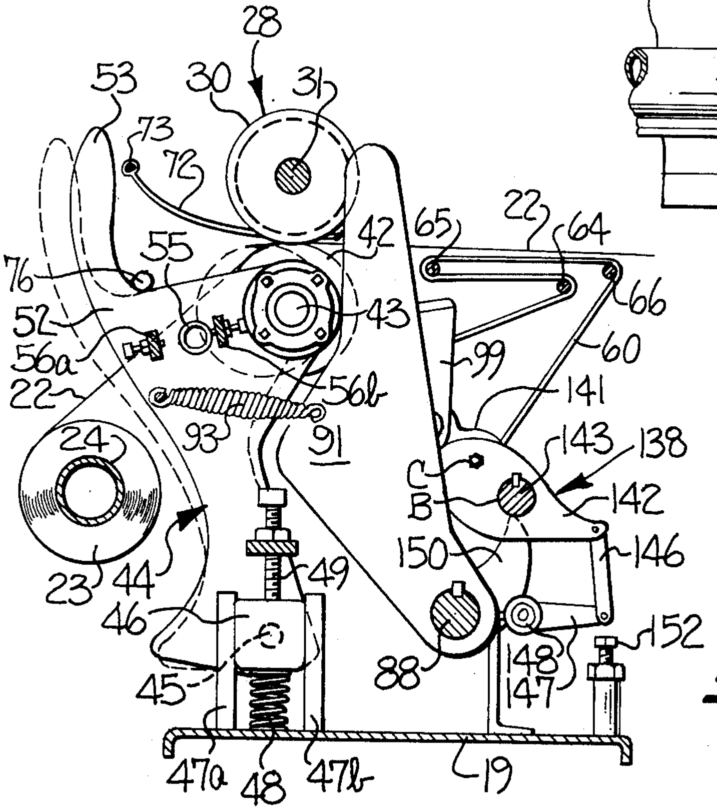
FIG. 2 is a fragmentary sectional side elevation view of the apparatus and taken substantially along the line 2—2 of FIG. 1.

The carriage 44 further comprises end plates 51, 52 having handle-like extensions 53 thereon to facilitate the manual gripping thereof, and an arcuately curved face plate 54 which serves to underlie the wound supply roll 23, note FIG. 3. In addition, the carriage 44 includes a shoulder 55 carried by one of the end plates, and cooperating adjustable stops *56a, 56b* carried by the adjacent side support plate of the frame for limiting the pivotal movement of the carriage between the solid and dashed line positions illustrated in FIGS. 2 and 3. By design, when the carriage is fully forward and resting against the stop *55b* (which is the operative position), the center of the shaft 43 is positioned slightly forward of a center line drawn between the shafts 31 and 45. Since the spring 48 acts to bias the carriage and lower feed roller 42 upwardly into firm engagement with the upper feed roller 30, the above described "over center" arrangement serves to maintain the carriage in its forward or operative position. Also, the rotation of the upper roller is imparted to the lower roller.

The spring 48 further acts as a safety feature to permit the separation of the rollers 30, 42 in the event an object inadvertently enters the nip of the rollers. As a further safety feature, a limit switch 57 is mounted on each of the side support plates 17 and 18 (note FIG. 3), each switch 57 being operatively controlled by a horizontally directed arm 58 of the carriage to terminate operation of the apparatus in the event of either downward or rearward pivotal movement of the carriage. The fact that the carriage is pivotable rearwardly permits the operator to separate the rollers to facilitate the initial threading of the web therethrough. In this regard, each abutment 49 is preferably adjusted such that the force of the springs 48 acts across the nip of the rollers, and the carriage and lower feed roller lift slightly upon rearward pivotal movement of the carriage.

Figure 4:
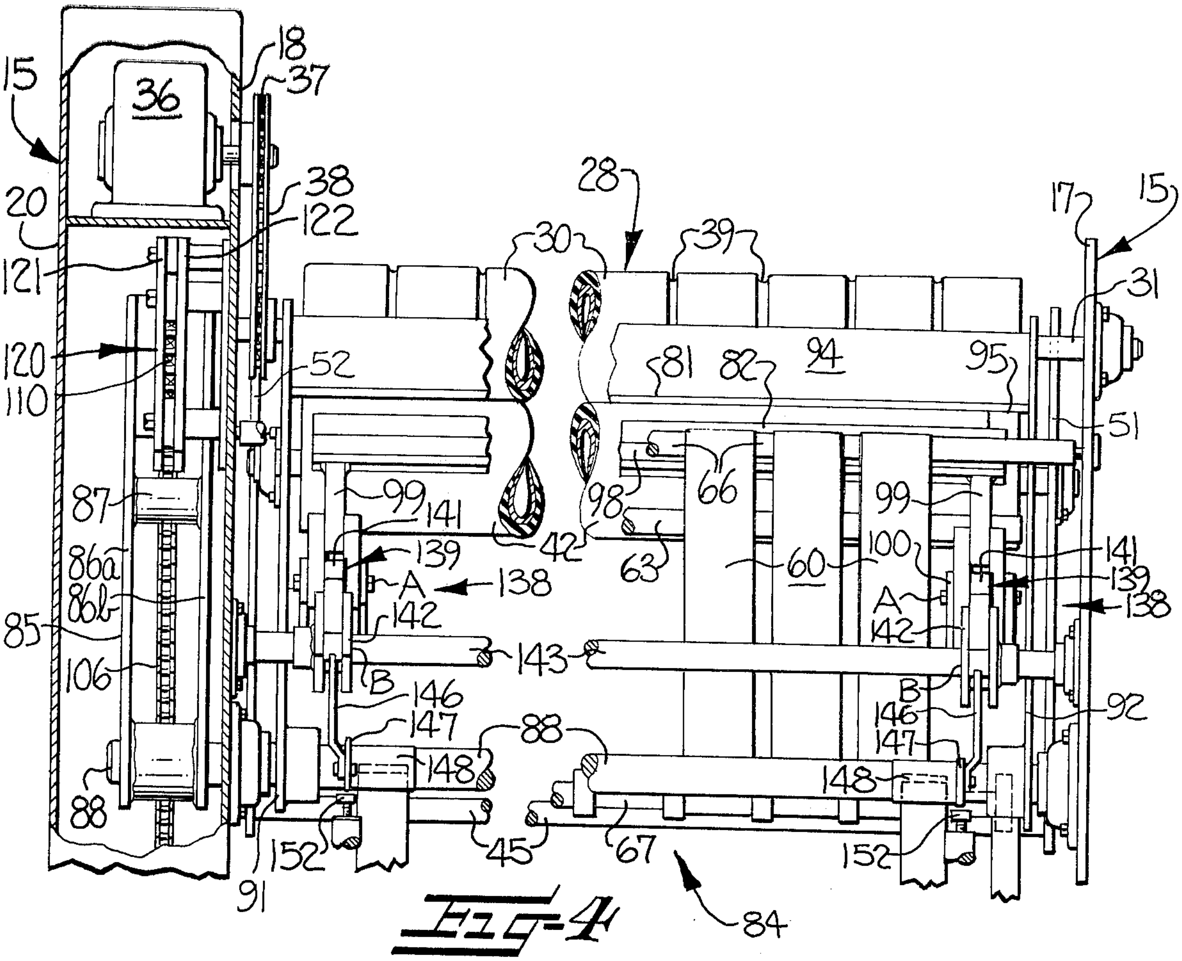
FIG. 4 is a fragmentary front elevation view, with the housing broken away to show the interior thereof.

A plurality of endless bands 60 composed of woven fabric tape or the like are entrained about the lower feed roller 42. The bands 60 are spaced along the longitudinal length of the roller as best seen in FIG. 4, and they extend through the nip of the feed rollers and forwardly therefrom along a portion of the path of travel of the web 22 to thereby support the web thereon after passing through the nip. More particularly, after traveling a relatively short distance along the horizontal path of travel of the web after passing through the nip, the bands 60 are directed substantially vertically about the roller shaft 61, and they continue downwardly across the intermediate roller shaft 62, and then about the lower roller shaft 63. The bands 60 then again rise to the level of the path of travel of the web so as to provide a further support therefor. In this regard, the bands are entrained about the three additional roller shafts 64, 65, and 66. The bands then run downwardly and about the weighted rod 67, and then upwardly about the roller shaft 68 and the feed roller 42. The roller shafts 64 and 66 are mounted for rotation about fixed horizontal axes which extend between the side support plates 17, 18 of the frame, while the shaft 68 is rotatably mounted on the carriage 44. The shafts 61, 62, 63, and 65 are rotatably mounted on an arrangement hereinafter further described.

The weighted rod 67 is mounted for free vertical movement within the brackets *70a, 70b* which are mounted on the support plate 19 of the frame 15. By this arrangement, the bands 60 are biased downwardly to maintain a desired degree of tension therein, and also, the vertical movement of the rod 67 permits the carriage 44 to be pivoted rearwardly in the manner described above.

In order to prevent the advancing web 22 of sheet material from wrapping about the upper roller during operation, there is provided a horizontally directed guide rod 72 extending through the nip and within each of the channels 39 in the upper roller. The rods 72 are typically fabricated from wire reinforced plastic tubing, and are mounted in a manner hereinafter further described. If desired, the outer extremities of the guide rods may be interconnected by a transverse rod 73 to provide greater rigidity thereto, note FIG. 1. Thus during the feeding operation, the endless bands 60 serve to support and guide the advancing web from below, while the rods 72 serve to restrict and guide the advancing web from above.

A canvas sheet 75 may also be provided for placing a drag on the wound supply roll 23 and thereby facilitate the feeding operation. As best seen in FIG. 3, the canvas sheet 75 has a rod 76 fixed to the upper edge thereof for supporting the same between the extensions 53 of the carriage. A weighted rod 77 is fixed to the bottom edge, such that the sheet frictionally contacts the supply roll to thereby prevent its free rotation. Also, the canvas may be easily removed from the apparatus by manually lifting the upper rod 76 from the extensions 53 in a manner which will be apparent.

The apparatus of the present invention further comprises knife means 80 which extends transversely across the path of travel of the web material for cutting the advancing web 22 into individual cut segments. The knife means 80 comprises an upper cutting blade 81 positioned immediately above the path of travel, a lower cutting blade 82 positioned immediately below the path of travel, and means (described below) for slideably mounting the lower cutting blade with respect to the upper cutting blade such that the blades may be selectively closed to effect the cutting of the web and opened to permit the free passage of the web therethrough.

The knife means 80 is mounted on the frame by an arrangement which includes the rocker arm means generally indicated at 84, the rocker arm means comprising a rocker arm 85 composed of first and second aligned plates 86*a*, 86*b* positioned within the housing. The plates 86*a*, 86*b* are fixedly interconnected by the tubular member 87, and are fixedly carried by the shaft 88 for rotation therewith. The shaft 88 extends in a horizontal direction between the side support plates 17, 18, and is rotatably mounted thereto with one end extending into the housing 20. Each of the plates 86*a*, and 86*b* of the rocker arm 85 includes a cam follower surface composed of a rearwardly facing surface 89*a* and a forwardly facing surface 89*b* for the purposes hereinafter set forth.

The rocker arm means 84 further comprises a pair of knife support plates 91, 92 which are also fixedly carried by the shaft 88 so as to be rotated therewith. Each of the knife support plates is mounted adjacent one of the side support plates 17, 18 of the frame, and is biased rearwardly by a spring 93, note FIG. 2. More particularly, one of the springs 93 is interconnected between the side support plate 17 and adjacent knife support plate 92, and the other spring is interconnected between the side support plate 18 and knife support plate 91. An adjustable abutment 97 is positioned within the housing 20 for engaging the plate 86*a* and thereby limiting the rearward movement of the rocker arm means 84, note FIG. 10. The upper cutting blade 81 is fixedly attached to the angle bracket 94 which extends between the knife support plates, and it will be noted that the guide rods 72 are fixedly carried thereby, note FIG. 3. The knife support plate 92 further carries a guide block 95 for guiding the movement of the lower blade into engagement with the upper blade during the cutting operation, note FIGS. 8 and 9. A second angle bracket 96 also is fixedly mounted between the knife support blades, and the above described roller shafts 61, 62, and 63, are rotatably mounted therebetween.

The lower cutting blade 82 is slideably carried between the knife support plates 91, 92 by an arrangement which includes a reinforcing angle bracket 98 secured therebetween. The roller shaft 65 is rotatably mounted immediately above the bracket 98, and a pair of downwardly extending cutting arms 99 are fixedly secured to the angle bracket 98, with one such arm being positioned adjacent each end thereof. A pivot arm 100 is carried by each knife support plate 91, 92 and each has one end thereof pivotally connected to the associated knife support plate and the opposite end pivotally connected to the cutting arm 99 to define a pivotal axis A. A plurality of springs 102 are spaced along the length of the lower cutting blade in the manner shown in FIG. 9, the springs 102 serving to interconnect the lower cutting blade with the bracket 96 such that the blade 82 is biased toward the guide block 95 and upper cutting blade 81 to thereby effectively preclude the separation thereof during the cutting of the web of sheet material. Also as seen in FIG. 9, the lower cutting blade 82 is angularly offset in a vertical plane with respect to the upper cutting blade so as to achieve a shearing cut during the closure thereof. Where relatively heavy sheet material is to be cut, it may be desirable to also angularly offset the lower cutting blade in a horizontal plane with respect to the upper cutting blade to thereby increase the force of the shearing cut.

The apparatus of the present invention further comprises means generally indicated at 105 for periodically oscillating the rocker arm means 84 and knife means 80 about the transverse axis defined by the shaft 88. The means 105 includes an endless non-slip belt in the form of a chain 106 entrained about a plurality of sprockets 33, 108, 109, 110, and 111 to define a trackway of predetermined length. As note above, the sprocket 33 is fixedly connected to the shaft 31 for rotation therewith, and the lower sprocket 108 is mounted on the frame so as to be vertically adjustable such that the length of the chain 106 may be readily changed. More particularly, the lower sprocket 108 is rotatably mounted on a stud 113 which is adapted to be positioned along the vertically extending brackets 114*a*, 114*b*.

Figure 10:
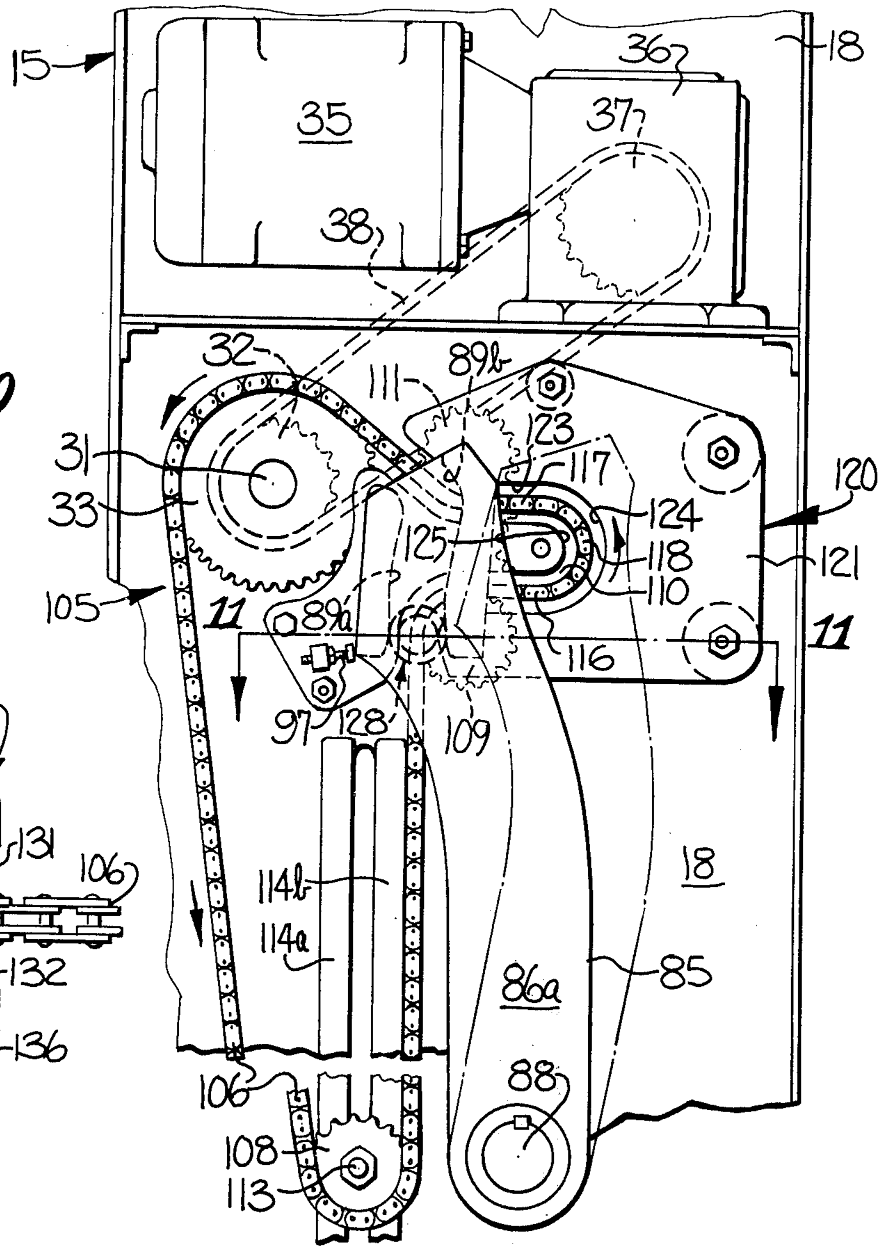
FIG. 10 is a fragmentary side elevation view of the interior of the housing and particularly showing the trackway followed by the endless chain and the pivotal movement of the rocker arm.

The three sprockets 109, 110, and 111 are rotatably mounted on the side support plate 18 within the housing 20, and are disposed in a triangular arrangement to define a forwardly directed segment 116 of the trackway, a rearwardly directed segment 117, and an arcuate segment 118 interconnecting the segments 116 and 117, note FIG. 10. Thus the three segments 116, 117, and 118 define a U-shaped section in the trackway which is generally aligned in the lateral direction with the nip of the feed rollers 30, 42, and the path of travel of the web material. In the illustrated embodiment, the pitch diameter of the upper sprocket 33 corresponds to the outer diameter of the upper feed roller 30 such that the chain 106 is advanced along its trackway at a speed corresponding to the linear speed at which the web 22 is advanced by the feeding means 28.

Figure 11:
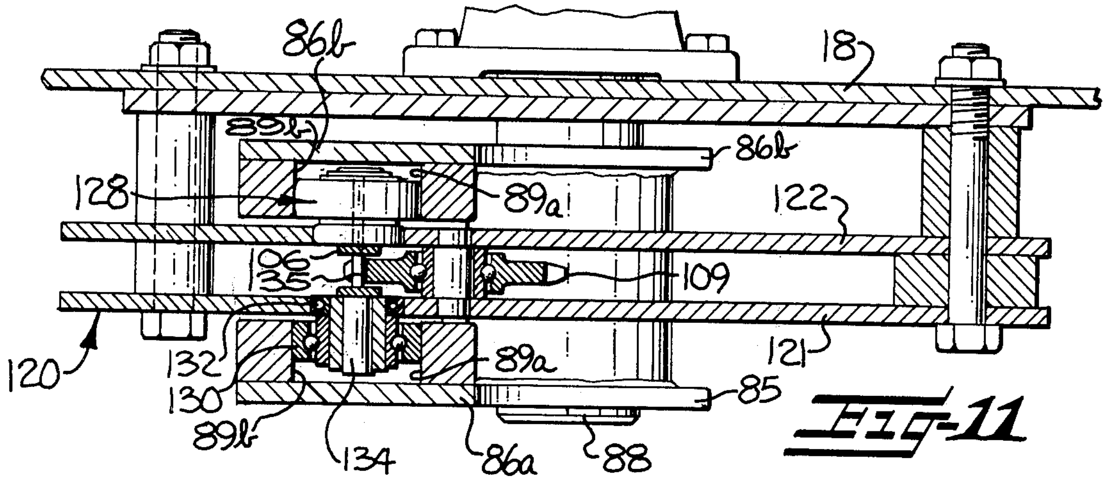
FIG. 11 is a vertical sectional view taken substantially along the line 11—11 of FIG. 10.

The oscillating means 105 further comprises guide plate means 120 carried by the side support plate 18 of the frame within the housing 20, the guide plate means comprising two laterally spaced apart guide plates 121 and 122, with the near side plate 121 being positioned on one side of the chain, and the far side plate 122 being positioned outside the chain, note FIG. 11. In addition, each guide plate includes a generally U-shaped channel 123 which conforms to the U-shaped section of the chain trackway, with each channel thereby defining opposing edge surfaces 124, 125.

Figure 12:
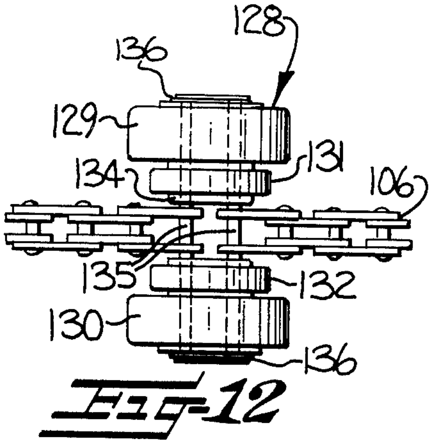
FIG. 12 is a fragmentary perspective view of a section of the chain and illustrating the control member for actuating the rocker arm.

At least one control member 128 is carried by the chain 106 as best seen in FIG. 12. The control member 128 comprises a pair of cams 129, 130 in the form of roller bearings, with one cam being positioned on each side of the chain. A pair of cylindrical rollers 131, 132, which are also in the form of roller bearings, are similarly positioned on each side of the chain and inside of the associated cam. Each cam and roller combination are interconnected by a substantially solid cylindrical stud 134 to effectively transmit a high degree of stress therebetween, and a pair of pins 135 corresponding in size to the pins in the remaining portion of the chain extending through appropriate apertures in the studs and are releasably locked thereto by a conventional lock-key arrangement, which is generally indicated at 136.

As the chain 106 is translated along its trackway, the control member 128 enters the forwardly directed segment 116, at which time the cams 129, 130 enter between the cam follower surfaces 89*a*, 89*b* of the rocker arm 85, and the rollers 131, 132 follow the opposing edge surfaces 124, 125 in the channels 123 of the guide plates 121, 122, note FIG. 11. By this arrangement, the rocker arm 85 is oscillated forwardly and then rearwardly about the axis of shaft 88 by the passage of the control member 128 through the U-shaped section of the trackway. As will become apparent, the frequency of such oscillation may readily be controlled by the number of control members 128 employed, or by changing the length of the chain 106 between control members in the manner described above. Further, since the chain 106 is moving at a speed corresponding to the speed at which the web 22 is advanced by the feeding means, that portion of the rocker arm 85 which is laterally aligned with the web path of travel will move forwardly at a corresponding speed during its forward oscillation.

It will be appreciated that during the acceleration and deceleration of the rocker arm 85 in the manner described above, considerable stresses will necessarily be transmitted across the control member 128 and between the rocker arm 85 and guide plates 121, 122. These stresses are transmitted by the studs 134, and not by the relatively small pins 135 or the chain 106 itself, thereby permitting the size of the chain to be minimized. Typically, the chain 106 comprises a ½ inch pitch (No. 40) standard roller chain.

Toggle means generally indicated at 138 is provided for actuating the knife means during each forward oscillation thereof, such that the cutting blades 81, 82 are initially closed to effect the cutting action and then quickly opened to avoid interference with the advancing web. In this regard, the toggle means 138 also acts to maintain the separation of the cutting blades during each rearward oscillation in a manner which will become apparent.

Figure 5:
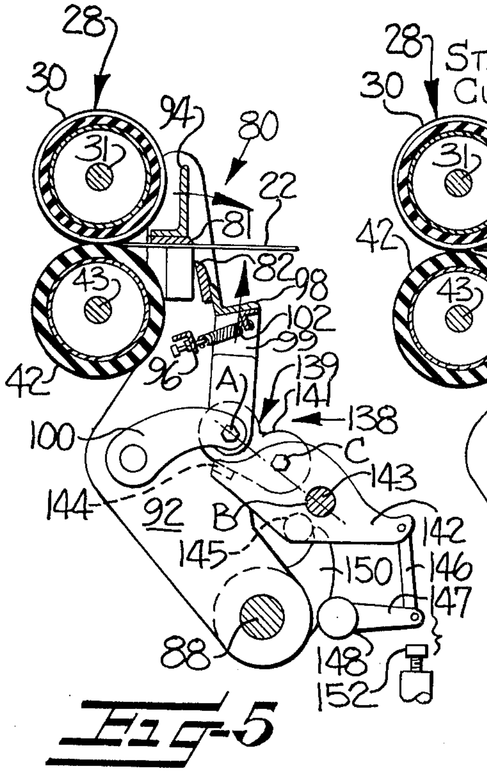
FIGS. 5–7 are fragmentary side elevation views showing the sequence of the web cutting operation.
Figure 6:
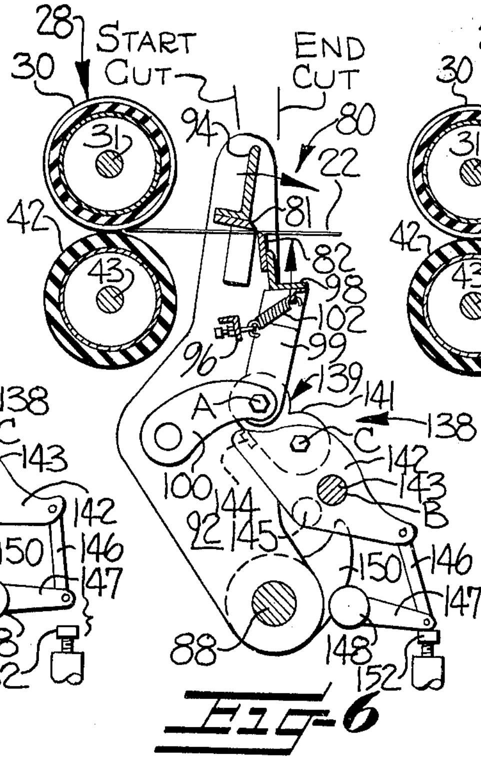
Figure 7:
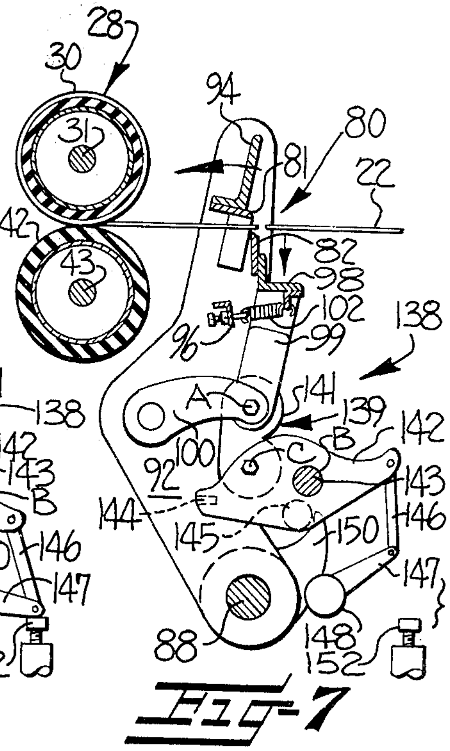

As best seen in FIGS. 5–7, the toggle means 138 comprises a toggle linkage 139 pivotally secured to each of the downwardly extending cutting arms 99 such that a toggle linkage is positioned adjacent each end of the lower cutting blade 82. Each toggle linkage comprises a link 141 pivotally connected to the associated cutting arm 99 and pivot arm 100 for pivotal movement about the first pivotal axis A, and a crank 142 mounted for rotation about the shaft 143 which is fixedly mounted to the frame and extends between the side support plates 17, 18. The axis of the shaft 143 defines a second pivotal axis B, and the link 141 and crank 142 are pivotally interconnected to define a third pivotal axis C which is positioned intermediate the first and second axes. Thus the link and crank are relatively rotatable between a first relative position (FIG. 5) wherein the third axis C is positioned a relatively short distance on one side of a line extending between the first and second axes, and a second relative position (FIG. 7) wherein the third axis is positioned a relatively long distance on the other side of a line extending between the first and second axes.

The crank 142 includes a shoulder 144 which is positioned to engage the link 141 for precluding relative rotation of the link and crank beyond the first relative position in a direction away from the second relative position, i.e., clockwise rotation of the crank 142 as seen in FIG. 5. The crank further includes a cylindrical shoulder 145 for the purposes set forth below.

Each toggle linkage 139 also includes first and second interconnected linkages 146, 147, the first linkage 146 being pivotally connected to the crank 142, and the second linkage 147 being operatively connected to a dampening member 148 which is fixedly carried by the frame. The dampening member 148 is of conventional construction, and serves to cushion any shock resulting from the quick rotation of the crank about the axis B. The toggle linkage further includes an arcuate tongue 150 fixedly carried by the shaft 88 for rotation therewith, the tongue being positioned to engage the cylindrical shoulder 145 as hereinafter further explained. Finally, the toggle linkage includes an abutment 152 in the form of an adjustably positioned stud which is carried by the horizontal plate 19 of the frame immediately below the first linkage 146 so as to be engaged thereby during the cutting operation, note FIG. 6.

The operation of the apparatus will now be described in more detail. Initially, the wound supply roll 23 of web material is mounted on the supporting bearings 26*a*, 26*b*, 26*c*, (FIG. 3) and the carriage 44 is manually withdrawn rearwardly to separate the feed rollers and permit the operator to manually thread the web 22 through the nip. The carriage 44 is then moved forwardly into its operative position, the "over center" arrangement of the shaft 43 with respect to the shafts 31 and 45 serving to maintain the carriage in this operative position, while the springs 48 serve to bias the carriage and lower roller upwardly into engagement with the upper roller.

The apparatus is set into operation by energizing the electric motor 35 which causes the shaft 31 and upper roller 30 to rotate, which in turn causes the bands 60 to be translated along their path of travel, and the lower roller 42 to rotate and thereby advance the web 22 forwardly through the apparatus at a predetermined speed.

The rotation of the shaft 31 also rotates the drive sprocket 33 to result in the chain 106 being translated along its trackway. Upon the control member 128 entering the U-shaped section of the trackway, the rocker arm 85 is oscillated forwardly and then rearwardly by the engagement between the cams 129, 130 and cam follower surfaces 89*a*, 89*b*. In this regard, it is noted that the relative positioning of the sprockets 109, 110, and 111, and the configuration of the channels 123 in the guide plate means serve to gradually accelerate and decelerate the rocker arm in each direction to thereby prevent undue stresses on the various components. Also, since the chain 106 is moving at a linear speed corresponding to that of the advancing web, and since the cam follower surfaces 89 of the rocker arm 85 are laterally aligned with the knife means 80, the knife means will be reciprocated forwardly and rearwardly to define a stroke which extends in a direction substantially parallel to the path of travel of the web 22, and it will also be forwardly advanced at a speed corresponding to the advance of the web during the actuation of the cutting operation.

In describing the operation of the knife means 80 for cutting the web, it should be noted that the rocker arm 85, knife support plates 91, 92, and tonges 150 are all fixedly carried by the shaft 88 for concurrent rotation therewith. Thus the oscillation of the rocker arm 85 caused by the movement of the control member 128 through the U-shaped section of the trackway is transmitted to the knife support plates and tongue.

The knife support plates and toggle linkages initially assume the position illustrated in FIG. 5. In this position, the knife support plates 91, 92 are biased in the rearward direction by the springs 93, further rearward movement being precluded by the abutment 97. Also, the springs 102, which not only bias the lower cutting blade laterally toward the upper cutting blade, serve to bias the lower blade and cutting arm 99 downwardly toward the link 141 to thereby "lock" the link 141 and crank 142 in their first relative position and against the interengagement between the shoulder 144 and link.

As the knife support plates pivot clockwise, the cutting arm 99 is moved upwardly due to the pivotal movement of the knife support plates toward the fixed axis B to thereby effect the cutting operation. At the conclusion of the cutting operation, the linkage 146 engages the abutment 152 to preclude further rotation of the toggle linkage about the axis B (FIG. 6), thus causing the pivotal axis C to move across a line between the axes A and B. When this occurs, the force of the springs 102 causes the link and crank to quickly pivot to their second relative position (FIG. 7), further movement being precluded by the engagement between the tongue 150 and cylindrical shoulder 145 of the crank. Thus the lower cutting blade is quickly withdrawn from the upper cutting blade at the conclusion of the cutting operation and just prior to the control member 128 entering the arcuate segment 118 of the trackway. Thus the lower cutting blade is withdrawn prior to any deceleration, to thereby avoid any interference of the blade with the advancing web.

Upon rearward oscillation of the knife support plates, the counterclockwise rotation of the tongue 150, which is in contact with the cylindrical shoulder 145, causes the crank 142 to rotate clockwise about the axis B. Thus the axis C passes onto the original side of a line between the axes A and B, and the link and crank are "cocked" to thereby again assume their first relative position. In this regard, it should be noted that the lower cutting blade 82 remains below the level of the advancing web of material during the rearward oscillation, since the "cocking" of the toggle element does not occur until near the end of such oscillation. Thus when the "cocking" occurs, the lower cutting blade is well below the level of the web of material.

As noted above, the length of the cut segments may be readily varied between wide limits by adding additional control members 128 and/or changing the length of the chain 106 between control members. The adjustment will be within fixed increments defined by the pitch of chain segments (typically ½ inch), and the shortness of the cut segments is limited only by the fact that each control member must be removed from the U-shaped section of trackway prior to the next control member entering therein. Also, the length of the cut segments could, if desired, be greatly extended by looping the chain about additional idler sprockets. In addition, by placing several control members on the chain at nonuniform spacings, the length of the sequential cuts can be varied so that segments of differing lengths can be simultaneously prepared.

In the processing of certain plastic web materials, it has been found that static electricity often develops on the web so as to interfere with the stacking and handling of the cut segments. Such static electricity may be substantially eliminated by placing one or more conventional static eliminators on the apparatus for bleeding the static charges from the web during its advance through the apparatus.

In the drawings and specification, there has been set forth a preferred embodiment of the invention, and although specific terms are employed, they are used in a generic and descriptive sense only and not for purposes of limitation.

That which is claimed is:

1. An apparatus for accurately and efficiently cutting a continuous web of sheet material into individual cut segments of predetermined length and having provision for readily adjusting the length of the cut segments between wide limits, said apparatus comprising a frame, means carried by said frame for continuously feeding the web along a predetermined path of travel, knife means extending transversely across said path of travel for cutting the web of sheet material into individual cut segments, means for mounting said knife means on said frame such that said knife means may be periodically reciprocated forwardly and rearwardly to define a stroke which extends along a direction substantially parallel to said path of travel of the web of sheet material, said mounting means including a cam follower surface, means for periodically reciprocating said knife means along said stroke, and comprising an endless nonslip belt carried by said frame for translation about a predetermined trackway, means for continuously translating said belt about said trackway at a predetermined speed, and cam means carried by said belt for engaging said cam follower surface during a portion of the movement thereof along said trackway to thereby reciprocate said knife means along said stroke at a forward speed substantially corresponding to the speed at which the web is advanced by said feeding means, and means for actuating said knife means during each forward reciprocation thereof.

2. The apparatus as defined in claim 1 wherein said feeding means comprises first and second rollers, means for mounting said first and second rollers for rotation about parallel axes to define a nip therebetween, and means for rotating said first roller such that the rollers rotate in opposite directions to feed the web material through said nip.

3. The apparatus as defined in claim 2 wherein said first roller is mounted for rotation about a fixed axis, and wherein said means for mounting said second roller comprises a carriage pivotally mounted on said frame for pivotal movement about an axis extending parallel to and generally below the axes of said first and second rollers, said second roller being rotatably mounted on said carriage so as to be positioned generally below said first roller, and means for biasing said carriage and second roller upwardly toward said first roller to ensure a firm engagement between said first and second rollers across said nip, and whereby said carriage and second roller may be pivotally withdrawn from contact with said first roller to thereby facilitate the initial threading of the web material through said nip.

4. The apparatus as defined in claim 3 wherein said feeding means further comprises at least one endless band entrained about said second roller and extending through said nip and forwardly therefrom along a portion of said path of travel to support the web material thereon after passing through said nip, and means for resiliently mounting said endless band about said second roller such that said band firmly engages said second roller to rotate therewith and is free to move said second roller during pivotal movement of said carriage.

5. The apparatus an defined in claim 4 wherein said means for resiliently mounting said endless band comprises a horizontally disposed cylindrical rod mounted for free vertical movement on said frame and positioned generally below said second roller, said band encircling and underlying said rod such that the weight of said rod is supported by said band and biases said belt downwardly.

6. The apparatus as defined in claim 5 wherein said feeding means comprises a plurality of said endless bands spaced along the longitudinal length of said second roller.

7. The apparatus as defined in claim 6 wherein said first roller includes a plurality of circumferential channels spaced along the longitudinal length thereof, and said feeding means further comprises a horizontally directed guide rod extending through each of said channels and through said nip to thereby overlie the web material as it passes through said nip.

8. The apparatus as defined in claim 7 further comprising means carried by said frame for rotatably mounting a wound supply roll of the web material such that the web material may be fed into said nip.

9. An apparatus for accurately and efficiently cutting a continuous web of sheet material into individual cut segments of predetermined length and having provision for readily adjusting the length of the cut segments between wide limits, said apparatus comprising a frame, means carried by said frame for continuously feeding the web along a predetermined path of travel, rocker arm means pivotally carried by said frame for pivotal movement about an axis extending transverse to and spaced from said path of travel, said rocker arm means including a cam follower surface, knife means carried by said rocker arm means and extending transversely across said path of travel for cutting the web of sheet material into individual cut segments, means for periodically oscillating said rocker arm means and knife means about said transverse axis, said oscillating means comprising a. an endless chain, b. means for mounting said chain on said frame for translation about a predetermined trackway having a forwardly directed segment extending in a direction corresponding to the direction in which the web of material is advanced by said feeding means, c. means for translating said chain about said trackway at a speed coordinated with the speed at which the web of material is advanced by said feeding means, d. at least one cam releasably carried by said chain, said cam being positioned to engage said cam follower surface upon movement of said cam along said forwardly directed segment of said trackway to thereby forwardly oscillate said rocker arm means and knife means at a speed substantially corresponding to the speed at which the web of material is advanced by said feeding means, and means for actuating said knife during each forward oscillation of said rocker arm means and knife means, whereby the length of the cut segments may be readily adjusted by changing the number of cams carried by said chain.

10. The apparatus as defined in claim 9 wherein said trackway has a rearwardly directed segment extending in a direction generally opposite said forwardly directed segment, and an arcuate segment interconnecting said forwardly directed and rearwardly directed segments, such that said three segments define a U-shaped section in said trackway.

11. The apparatus as defined in claim 10 wherein said oscillating means further comprises a guide plate carried by said frame, said guide plate having a channel therethrough which overlies and conforms to said U-shaped section of said trackway, said channel defining opposing edge surfaces, and a roller carried by said chain immediately adjacent said cam so as to be engaged by said opposite edge surfaces of said channel in said guide plate and thereby ensure the desired movement of said chain and cam along said U-shaped section of trackway.

12. The apparatus as defined in claim 11 wherein said cam follower surface includes a rearwardly facing surface adapted to be engaged by said cam during movement thereof along said forwardly directed segment of said trackway, and a forwardly directed surface adapted to be engaged by said cam during movement thereof along said rearwardly directed segment of said trackway.

13. The apparatus as defined in claim 12 wherein said means for mounting said chain on said frame comprises a sprocket having said chain operatively entrained thereabout, and means for selectively mounting said sprocket on said frame at any one of a plurality of locations such that the effective length of said chain may be changed to thereby facilitate changing the length of the cut segments of web material.

14. The apparatus as defined in claim 13 wherein said knife means comprises a first cutting blade positioned on one side of said path of travel, a second cutting blade positioned on the other side of said path of travel, and means for slideably mounting said second cutting blade with respect to said first cutting blade such that the blades may be selectively closed to effect the cutting of the web and opened to permit the free passage of the web therethrough.

15. The apparatus as defined in claim 14 wherein said first and second cutting blades are angularly disposed with respect to each other so as to achieve a shearing cut during the closure thereof, and further comprising spring means for biasing said blades toward each other to thereby effectively preclude the separation thereof during the cutting of the web of sheet material.

16. The apparatus as defined in claim 15 wherein said means for actuating said knife means comprises a toggle linkage mounted adjacent each end of said knife means, each of said toggle linkages comprising a link pivotally connected to said second cutting blade to define a first pivotal axis, a crank mounted for rotation about a second pivotal axis, said link and crank being pivotally interconnected to define a third pivotal axis positioned intermediate said first and second pivotal axes, and means for rotating said link and crank in a first relative direction during each forward oscillation of said knife means to reciprocate said second cutting blade toward said first cutting blade and thereby effect the cutting of the sheet material, and for rotating said link and crank in the opposite relative direction during each rearward oscillation of said knife means.

17. An apparatus for accurately and efficiently cutting a continuous web of sheet material into individual cut segments of predetermined length, said apparatus comprising a frame, means carried by said frame for continuously feeding the web of sheet material along a predetermined path of travel, knife means extending transversely across said path of travel for cutting web of sheet material into individual cut segments, said knife means comprising a first cutting blade positioned on one side of said path of travel, a second cutting blade positioned on the other side of said path of travel, and means for slideably mounting at least one of said blades with respect to the other blade such that the blades may be selectively closed to effect the cutting of the web and opened to permit the free passage of the web therethrough, means for mounting said knife means on said frame to permit said knife means to be periodically reciprocated forwardly and rearwardly to define a stroke which extends along a direction substantially parallel to said path of travel of the web of sheet material, means for periodically reciprocating said knife means along said stroke and at a forward speed substantially corresponding to the speed at which the web is advanced by said feeding means, and toggle means for closing said cutting blades to effect the cutting of the web of sheet material and then quickly opening the same to separate said blades during each forward reciprocation of said knife means, and for maintaining the separation of said cutting blades during each rearward reciprocation of said knife means.

18. The apparatus as defined in claim 17 wherein said toggle means comprises a toggle linkage comprising a link pivotally connected to said one blade to define a first pivotal axis, a crank mounted for rotation about a second pivotal axis, said link and crank being pivotally interconnected to define a third pivotal axis positioned intermediate said first and second pivotal axes, and means for rotating said link and crank from a first relative position wherein said third axis is positioned on one side of a line entending between said first and second axes to a second relative position wherein said third axis is positioned on the other side of a line extending between said first and second axes during each forward reciprocation of said knife means, and for rotating said link and crank from said second relative position to said first relative position during each rearward reciprocation of said knife means.

19. The apparatus as defined in claim 18 wherein said toggle means further comprises one of said toggle linkages mounted adjacent each end of said knife means.

20. The apparatus as defined in claim 19 wherein said first and second cutting blades are angularly disposed with respect to each other so as to achieve a shearing cut during the closure thereof.

21. The apparatus as defined in claim 20 wherein each of said toggle linkages further comprises spring means for biasing said cutting blades toward each other to thereby effectively preclude the separation thereof during the cutting of the web of sheet material.

22. An apparatus for accurately and efficiently cutting a continuous web of sheet material into individual cut segments of predetermined length, said apparatus comprising a frame, means carried by said frame for continuously feeding the web of sheet material along a predetermined path of travel, rocker arm means pivotally carried by said frame for pivotal movement about an axis extending transverse to and spaced from said path of travel, knife means carried by said rocker arm means and extending transversely across said path of travel for cutting the web of sheet material into individual cut segments, said knife means comprising a first cutting blade fixedly carried by said rocker arm means on one side of said path of travel, a second cutting blade positioned on the other side of said path of travel, and means for slideably mounting said second cutting blade on said rocker arm means such that the blades may be selectively closed to effect the cutting of the web and opened to permit the free passage of the web therethrough, means for periodically oscillating said rocker arm means and knife means about said transverse axis such that during the forward oscillation thereof said knife means is moved at a forward speed substantially corresponding to the speed at which the web is advanced by said feeding means, and toggle means for closing said cutting blades to effect the cutting of said web of sheet material and then quickly opening the same to separate said blades during each forward oscillation of said knife means, and for maintaining the separation of said cutting blades during each rearward oscillation of said knife means.

23. The apparatus as defined in claim 22 wherein said toggle means comprises a link pivotally connected to said second cutting blade to define a first pivotal axis, a shaft fixedly carried by said frame and extending transverse to said path of travel and parallel to said transverse axis of said rocker arm means, a crank mounted for rotation about said shaft to define a second pivotal axis, said link and crank being pivotally interconnected to define a third pivotal axis positioned intermediate said first and second pivotal axes and wherein said link and crank are relatively rotatable between a first relative position wherein said third axis is positioned a relatively short distance on one side of a line extending between said first and second axes and a second relative position wherein said third axis is positioned a relatively long distance on the other side of a line extending between said first and second axes, abutment means fixedly carried by said frame for engaging said crank during the latter portion of each forward oscillation of said rocker arm means and knife means to thereby relatively rotate said link and crank from said first relative position to said second relative position, and tongue means fixedly carried by said rocker arm means for engaging said crank during each rearward oscillation of said rocker arm means and knife means to rotate said link and crank from said second relative position to said first relative position.

24. The apparatus as defined in claim 23 wherein said means for slideably mounting said second cutting blade on said rocker arm comprises a cutting arm fixedly carried by said second cutting blade, and a pivot arm having one end thereof pivotally connected to said rocker arm means and an opposite end pivotally connected to said cutting arm coaxially with said first pivotal axis.

25. The apparatus as defined in claim 24 wherein said toggle means further comprises shoulder means carried by one of said link and crank for precluding relative rotation of said link and crank beyond said first relative position in a direction away from said second relative position, and spring means for biasing said second cutting blade against said first cutting blade and in a direction toward said link to thereby maintain said link and crank in said first relative position until said crank is engaged by said abutment means during forward oscillation of said rocker arm means and knife means.

26. The apparatus as defined in claim 25 wherein said toggle means further comprises dampening means for cushioning any shock resulting from the quick movement of said toggle means.

* * * * *

UNITED STATES PATENT OFFICE

CERTIFICATE OF CORRECTION

PATENT NO. 3,965,785

DATED June 29, 1976

INVENTOR(S) : Herman S. Johns

It is certified that error appears in the above-identified patent and that said Letters Patent are hereby corrected as shown below:

Column 1, Line 17, "is" should be -- it --;
Column 1, Line 30, after "cam" insert -- drive --;
Column 1, Line 50 "desired" should be -- described --;
Column 3, Line 57, "55b" should be -- 56b --;
Column 7, Line 7, "extending" should be -- extend --;
Column 11, Line 20, "an" should be -- as --;
Column 13, line 65, "entending" should be -- extending --.

Signed and Sealed this

*Eighteenth* Day of *October 1977*

[SEAL]

*Attest:*

RUTH C. MASON
*Attesting Officer*

LUTRELLE F. PARKER
*Acting Commissioner of Patents and Trademarks*